(12) United States Patent
Dumais

(10) Patent No.: US 10,527,792 B2
(45) Date of Patent: Jan. 7, 2020

(54) SPIRAL OPTICAL WAVEGUIDE TERMINATION

(71) Applicant: Huawei Technologies Co., Ltd., Shenzhen (CN)

(72) Inventor: Patrick Dumais, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/142,434

(22) Filed: Apr. 29, 2016

(65) Prior Publication Data
US 2017/0315296 A1  Nov. 2, 2017

(51) Int. Cl.
| G02B 6/24 | (2006.01) |
| G02B 6/122 | (2006.01) |
| G02B 6/134 | (2006.01) |
| G02B 6/136 | (2006.01) |
| G02B 6/125 | (2006.01) |

(52) U.S. Cl.
CPC ............. *G02B 6/243* (2013.01); *G02B 6/122* (2013.01); *G02B 6/125* (2013.01); *G02B 6/134* (2013.01); *G02B 6/136* (2013.01); *G02B 6/1347* (2013.01)

(58) Field of Classification Search
CPC ...... G02B 6/0058; G02B 6/122; G02B 6/125; G02B 6/134; G02B 6/136; G02B 6/243; G02B 6/262; G02B 6/1347; G01J 3/0205; G01J 3/0218; G01J 3/0256; G01J 3/453
USPC .......................... 385/12, 13, 31–52, 129–132
See application file for complete search history.

(56) References Cited

U.S. PATENT DOCUMENTS

| 6,839,492 B2 * | 1/2005 | Kwon ................ G02B 6/12009 385/49 |
| 7,043,108 B1 | 5/2006 | Olsen |
| 8,542,957 B2 * | 9/2013 | Yamashita ........... G01N 21/552 385/12 |
| 2009/0185776 A1 * | 7/2009 | Kato ..................... G02B 5/003 385/16 |
| 2013/0259420 A1 | 10/2013 | Yoshida et al. |
| 2014/0133795 A1 | 5/2014 | Evans et al. |
| 2014/0185979 A1 * | 7/2014 | Evans ................ G02B 6/12004 385/14 |
| 2014/0266503 A1 | 9/2014 | Apostolos et al. |
| 2015/0117818 A1 * | 4/2015 | Matsumoto ............ G02B 6/305 385/43 |
| 2015/0168217 A1 * | 6/2015 | Englund ............... G01J 3/0205 356/451 |

(Continued)

FOREIGN PATENT DOCUMENTS

JP    2012204706 A    10/2012

OTHER PUBLICATIONS

Vilson R. Almeida et al., "Nano-taper for Compact Mode Conversion," Optics Letters, vol. 28, No. 15, pp. 1302-1304, 2003.

(Continued)

*Primary Examiner* — Michael P Mooney

(57) ABSTRACT

An optical waveguide termination comprising a light-receiving inlet for receiving light to be terminated, a curved section extending from the inlet and having a continuously decreasing radius of curvature, and a light-terminating tip at an end of the curved section. The curved section may define a spiral waveguide, for example a logarithmic spiral, having a waveguide width that continuously decreases from the inlet to the tip.

16 Claims, 8 Drawing Sheets

(56) References Cited

U.S. PATENT DOCUMENTS

| | | | |
|---|---|---|---|
| 2015/0212271 A1* | 7/2015 | Chen | G02B 6/243 385/14 |
| 2015/0309252 A1* | 10/2015 | Kato | G02B 6/12 385/11 |
| 2016/0087398 A1* | 3/2016 | Yoshida | G02B 6/29338 385/14 |

OTHER PUBLICATIONS

International Search Report for corresponding International Application No. PCT/CN2017/079758 dated Jun. 1, 2017.

* cited by examiner

SPIRAL OPTICAL WAVEGUIDE TERMINATION

TECHNICAL FIELD

The present disclosure relates generally to optical waveguides and, more particularly, to optical waveguide terminations.

BACKGROUND

Silicon photonic circuits complexity, density, and number of elements is growing as photonics gradually enters telecommunications products. Some large switch matrixes may have several hundred components in a single circuit. In several common switch architectures, some optical waveguides must be terminated. The termination of optical waveguides may also be required for other types of optical circuits and components such as those integrated into photonic platforms.

Imperfect termination causes back-reflections which are known to introduce noise in the optical signals propagating in the optical circuit or component. In a large circuit the individual noise contributions from these back-reflections can interact coherently to create unpredictable and significant impairments.

Accordingly, an improved technique for terminating waveguides is highly desirable.

SUMMARY

The following presents a simplified summary of some aspects or embodiments of the invention in order to provide a basic understanding of the invention. This summary is not an extensive overview of the invention. It is not intended to identify key or critical elements of the invention or to delineate the scope of the invention. Its sole purpose is to present some embodiments of the invention in a simplified form as a prelude to the more detailed description that is presented later.

In general, the present specification discloses a spiral optical waveguide termination for use primarily in silicon photonic integrated circuits.

One inventive aspect of the disclosure is an optical waveguide termination that includes a light-receiving inlet for receiving light to be terminated, a curved section extending from the inlet and having a continuously decreasing radius of curvature, and a light-terminating tip at an end of the curved section.

In some implementations, the curved section defines a spiral, e.g. a logarithmic spiral. In some implementations, the curved section has a waveguide width that continuously decreases from the inlet to the tip. In some implementations, the tip comprises a facet angled with respect to an inlet face of the inlet-receiving inlet to further suppress back-reflection. In some implementations, the optical waveguide termination includes a doped region.

Another inventive aspect of the disclosure is a photonic platform including a substrate, a buried oxide layer on the substrate, an optical circuit and an optical waveguide termination connected to the circuit. The optical waveguide termination includes a light-receiving inlet for receiving light to be terminated, a curved section extending from the inlet and having a continuously decreasing radius of curvature, and a light-terminating tip at an end of the curved section.

In some implementations, the curved section has a waveguide width that continuously decreases from the inlet to the tip. In some implementations, the optical waveguide is a partially etched silicon waveguide. The photonic platform may further comprise a doped region. In some implementations, the tip comprises a facet angled with respect to an inlet face of the inlet-receiving inlet to further suppress back-reflection. In some implementations, the curved section defines a spiral, e.g. a logarithmic spiral.

Yet another inventive aspect of the disclosure is a method of terminating light, the method comprising receiving light to be terminated at a light-receiving inlet of an optical waveguide termination, propagating the light through a curved section extending from the inlet and having a continuously decreasing radius of curvature, and terminating the light at a light-terminating tip at an end of the curved section.

In some implementations, propagating the light through the curved section comprises propagating the light through a spiral waveguide having a waveguide width that continuously decreases from the inlet to the tip. In some implementations, the method further comprises absorbing the light using a doped region.

BRIEF DESCRIPTION OF THE DRAWINGS

These and other features of the disclosure will become more apparent from the description in which reference is made to the following appended drawings.

DETAILED DESCRIPTION OF EMBODIMENTS

The following detailed description contains, for the purposes of explanation, numerous specific embodiments, implementations, examples and details in order to provide a thorough understanding of the invention. It is apparent, however, that the embodiments may be practiced without certain specific details or with an equivalent arrangement. In other instances, some well-known structures and devices are shown in block diagram form in order to avoid unnecessarily obscuring the embodiments of the invention. The description should in no way be limited to the illustrative implementations, drawings, and techniques illustrated below, including the exemplary designs and implementations illustrated and described herein, but may be modified within the scope of the appended claims along with their full scope of equivalents.

In general, a spiral-shaped optical waveguide termination (or terminator) having low back-reflection is disclosed herein. For the purposes of this specification, the expression "back-reflection refers to the reflectance or optical return loss, i.e. the amount of light that is reflected by the end facet of the waveguide. Various embodiments of the optical waveguide termination are described below with reference to the drawings.

Figure 1:
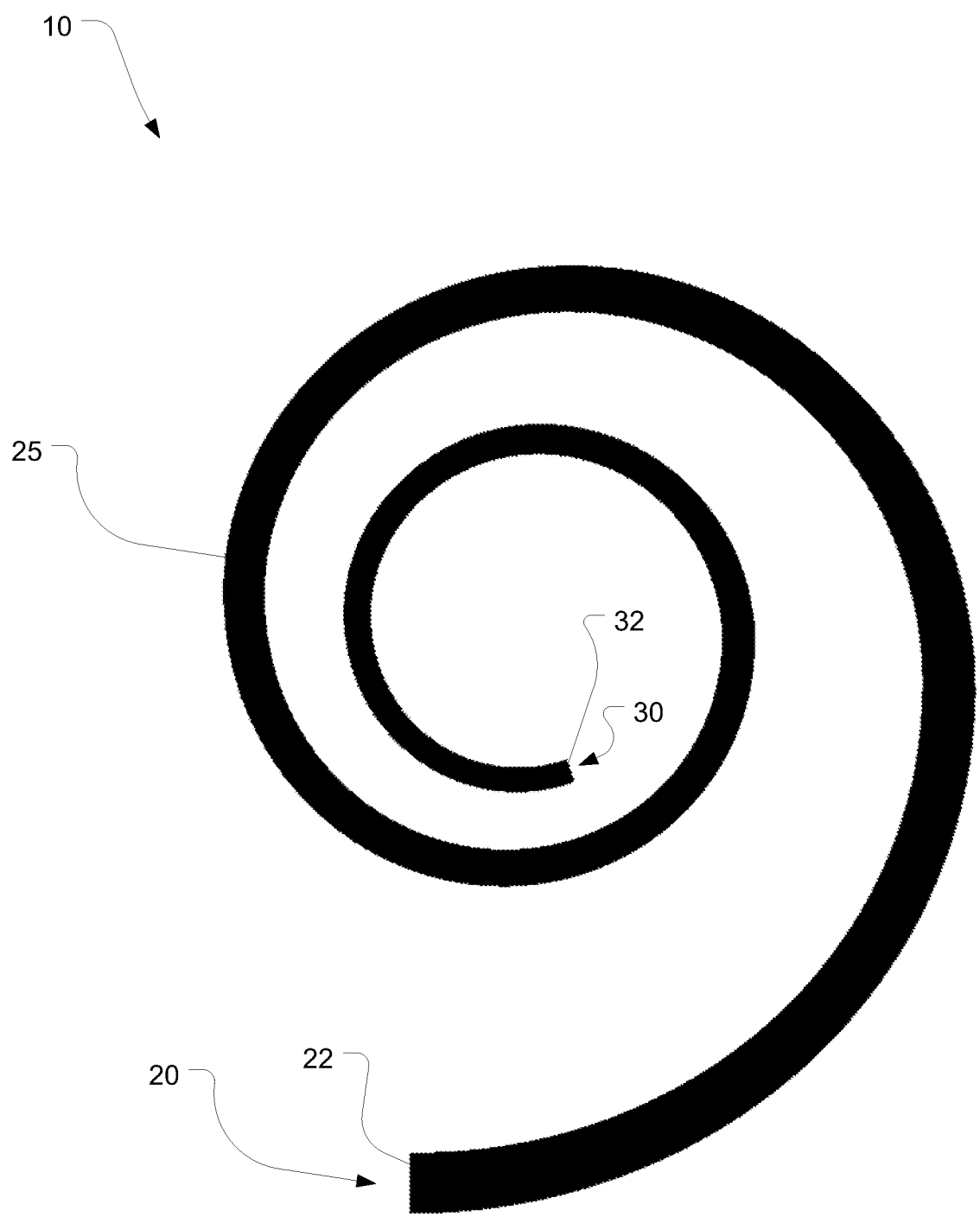
FIG. 1 illustrates a spiral optical waveguide termination having a continuously decreasing width in accordance with an embodiment of the present invention.
Figure 2:
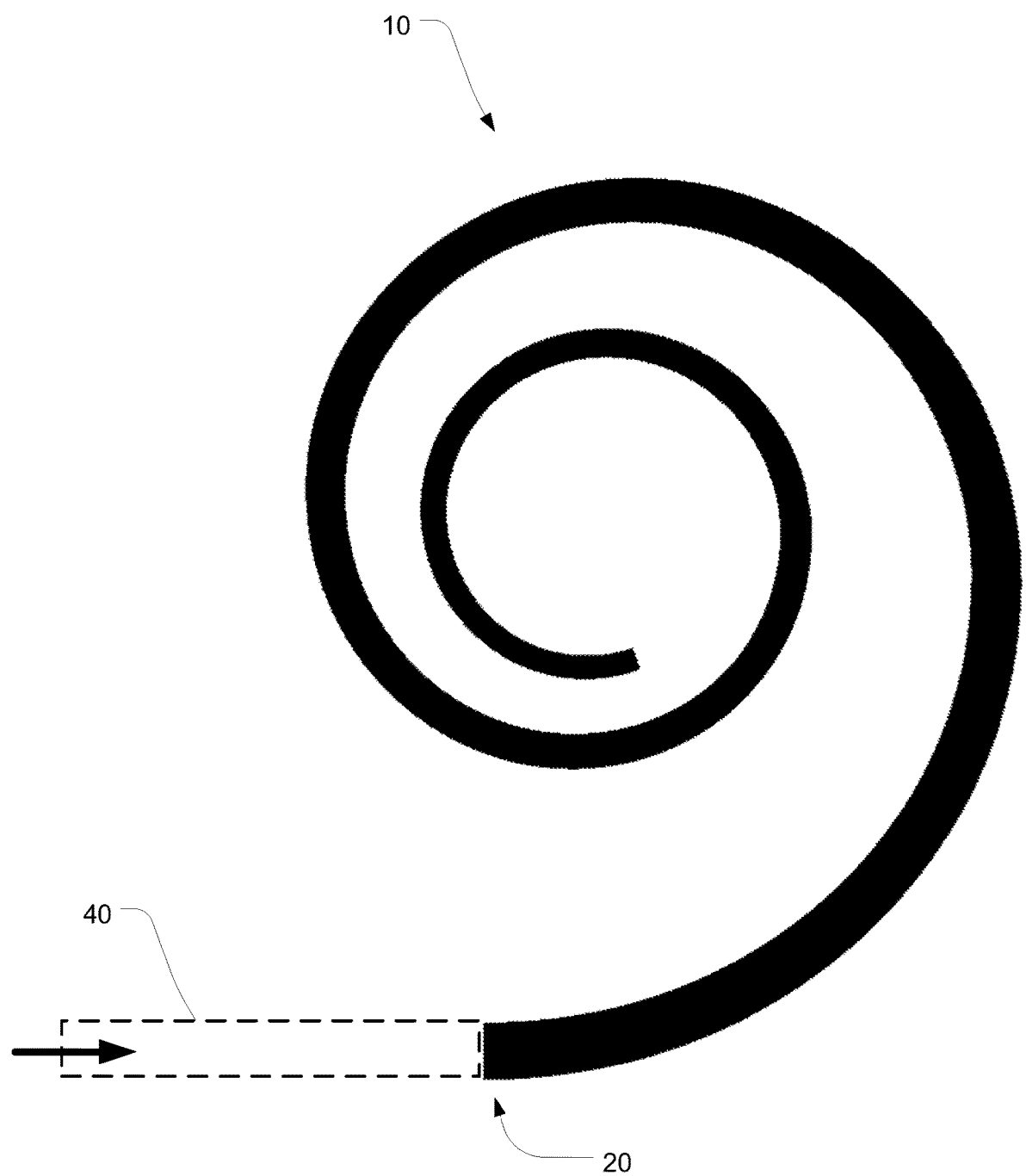
FIG. 2 illustrates the spiral optical waveguide termination of FIG. 1 connected to an optical circuit.

FIG. 1 illustrates an optical waveguide termination designated by reference numeral 10. The optical waveguide termination 10 includes a light-receiving inlet 20 for receiving light to be terminated. The optical waveguide termination 10 includes a curved section 25 extending from the inlet 20 and having a continuously decreasing radius of curvature. The optical waveguide termination 10 includes a light-terminating tip 30 at an end of the curved section 25. The curved section 25 defines a spiral. This spiral-shaped optical waveguide termination is not only compact but also exhibits low back-reflection. The compact design is particularly beneficial in dense photonic circuits where space is limited. In one example implementation, the spiral-shaped termination has a compact footprint of 6.5 μm×8.0 μm. These dimensions are solely presented as one example. The dimensions may be varied. As further illustrated in FIG. 1, the curved section 25 has a waveguide width W that continuously decreases from the inlet 20 to the tip 30. As depicted in FIG. 2, the inlet 20 may is connected to an optical circuit waveguide 40 of an optical circuit or optical component.

The continuously decreasing radius of curvature of the optical waveguide termination 10 increases a loss coefficient. Likewise, progressively reducing the width of the waveguide increases the loss coefficient. The spiral parameters are such that losses are distributed along the spiral length so that most power is radiated before the light reaches the tip. Distributing the losses in this manner reduces the amount of back-reflection. Tabulated below are back-reflection losses in decibels (db) for different types of waveguide terminations, as well as for an unterminated waveguide.

| Waveguide Termination | Back-Reflection (dB) | Comments |
| --- | --- | --- |
| Unterminated | −9 | Reference |
| Nanotaper, 200 nm tip | −20 | |
| Spiral as shown | −33 | Undoped |
| Spiral as shown | −45 | Doped waveguide (p++), no facet |

From the table above, it is apparent that the spiral-shaped optical waveguide termination 10 exhibits lower back-reflection than an unterminated waveguide and a nanotaper waveguide termination having the same tip width. For this specification, the expression "unterminated" means that the waveguide has no termination. As shown in the table above, the doped spiral waveguide is superior to the undoped spiral waveguide. In addition to the lower back-reflection, the spiral-shaped optical waveguide termination is both compact and able, by virtue of its geometry, to dissipate power over a relatively large area.

In some embodiments, the tip 30 includes a facet 32 angled with respect to an inlet face 22 of the inlet-receiving inlet 20 to further suppress back-reflection.

In the embodiment shown in FIGS. 1 and 2, the optical waveguide termination 10 is a logarithmic spiral. In a specific implementation, the radius of curvature varies on log scale from 5 μm to 1 μm over 30 μm length. In polar coordinates, the logarithmic spiral may be expressed as $r=ae^{b\theta}$ in which r represents the radius, a and b are arbitrary constants, θ represents the angle and the constant e represents the base of the natural logarithm. In other embodiments, the spiral may have another type of geometry, e.g. a hyperbolic spiral or an Archimedean spiral.

Figure 3:
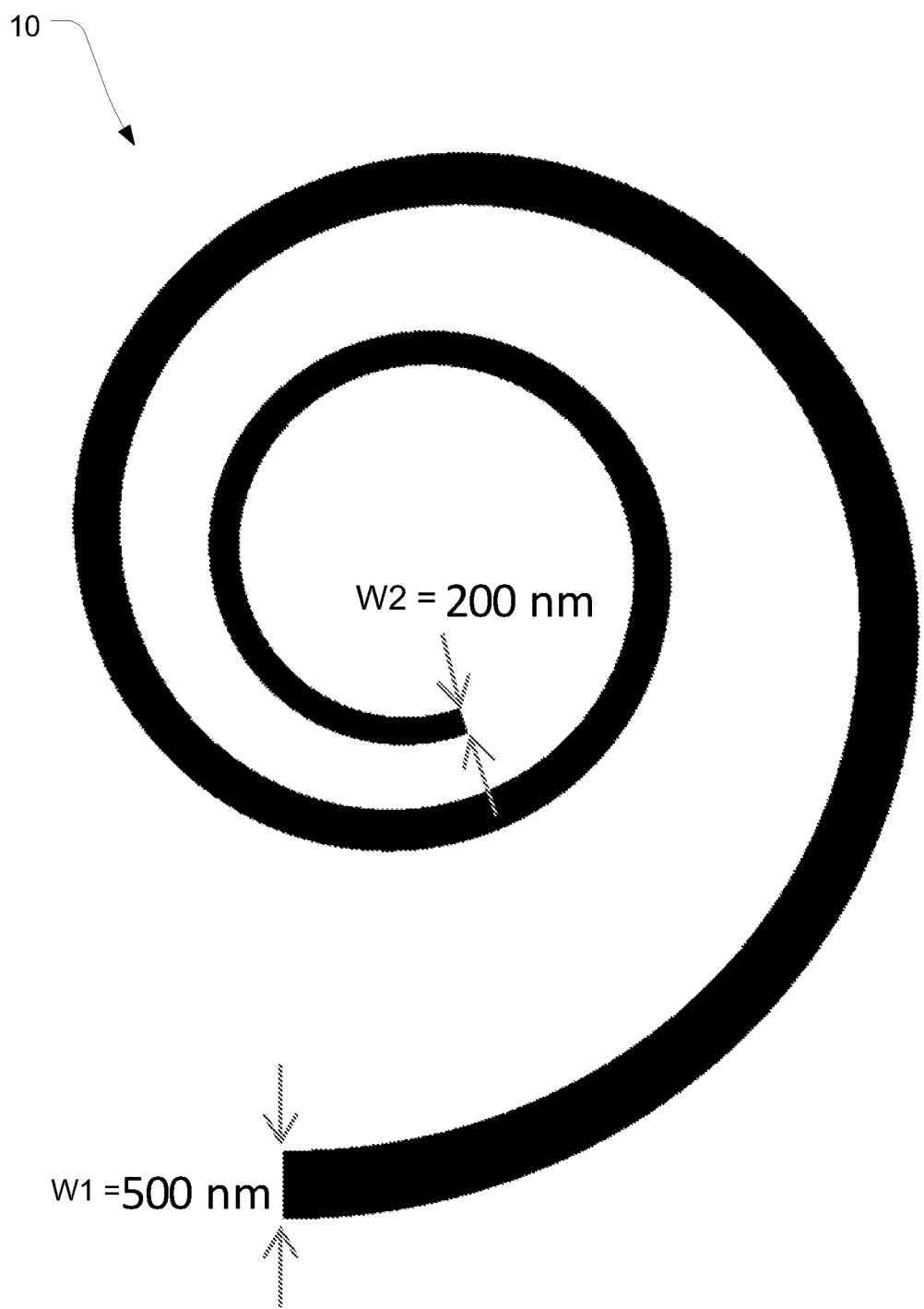
FIG. 3 illustrates one example of the spiral optical waveguide termination of FIG. 1 designed with specific dimensions.

One specific example of the optical waveguide termination 10 is presented in FIG. 3. In this specific example, the light-receiving inlet 20 has an inlet width W1 of 500 nm and the light-terminating tip 30 has a tip width W2 of 200 nm. These dimensions and the ratio W2/W1 are presented solely as an example and may be varied in other implementations.

Figure 4:
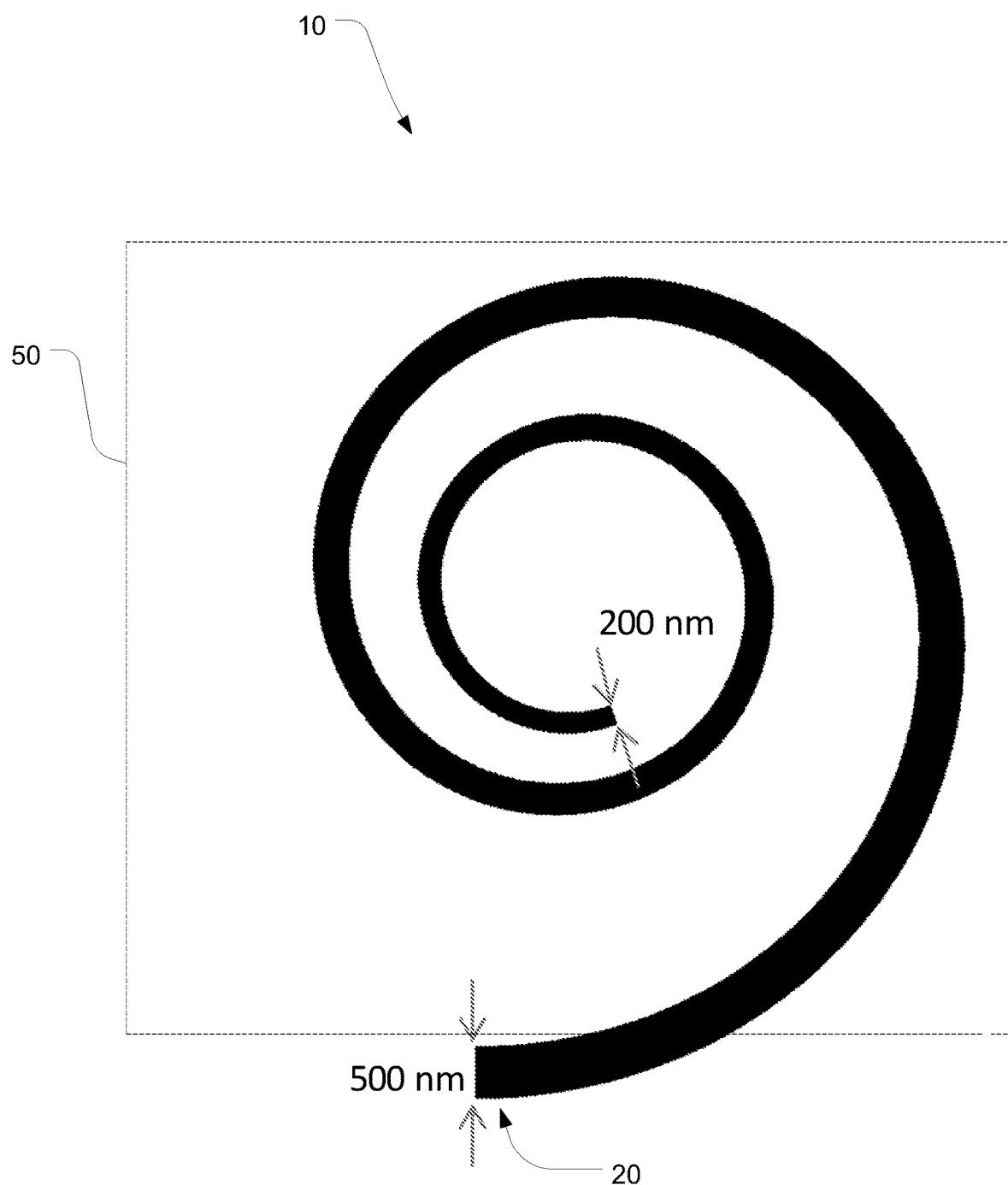
FIG. 4 illustrates the spiral optical waveguide termination with a doped region in accordance with another embodiment.

In another embodiment, which is depicted in FIG. 4, the optical waveguide termination 10 further includes a doped region 50 that may be formed using a dopant implantation window. In this illustrated embodiment, the inlet 20 is outside of the doped region 50. For these embodiments, it may be preferable to have a boundary of the doped region 50 crossing the curved section 25 at an acute angle to further reduce backreflection. Although the shape of the doped region 50 is rectangular, other shapes for the doped region 50 may be used.

Figure 5:
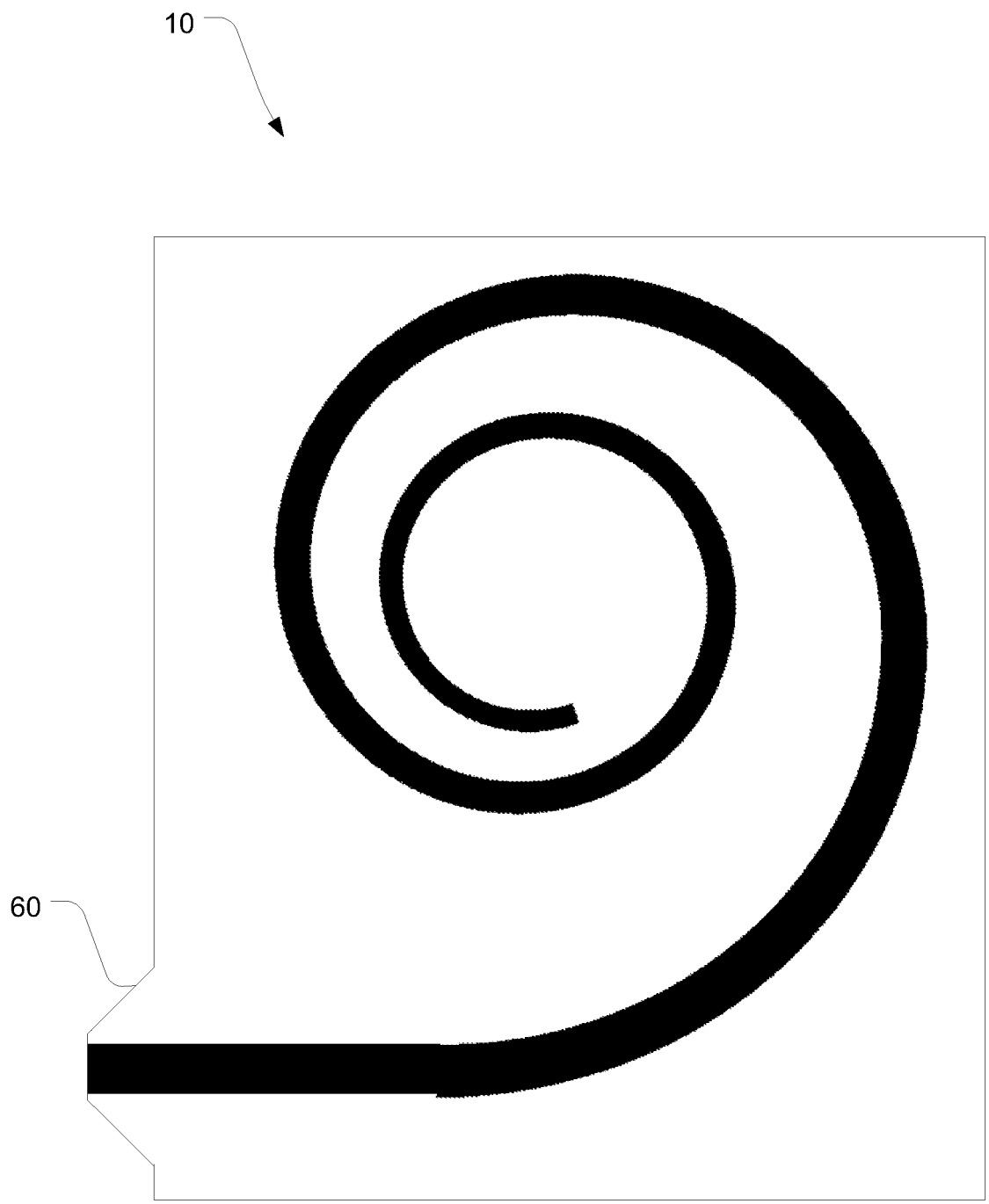
FIG. 5 illustrates a spiral optical waveguide termination formed by partially etching a silicon layer.

In one embodiment, the optical waveguide termination 10 is a silicon waveguide although the waveguide may be made of any material with equivalent optical properties. The silicon waveguide may be formed by being partially etched as depicted in FIG. 5. Alternatively, the silicon waveguide may be formed by being fully etched. The partially etched optical waveguide termination may also include the doped region 50 described above.

Figure 6:
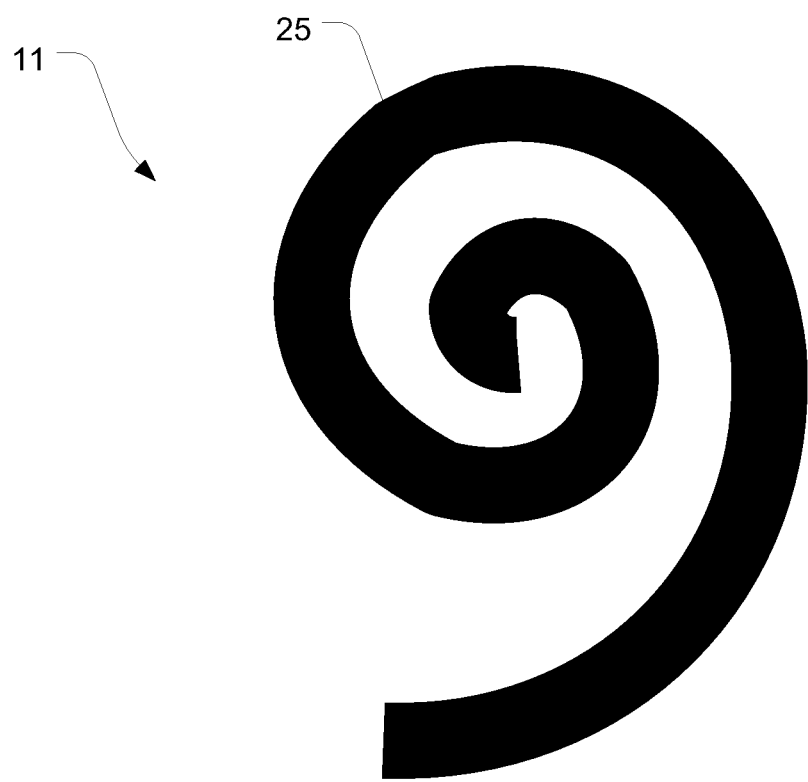
FIG. 6 illustrates a spiral optical waveguide termination having a uniform width in accordance with another embodiment.

FIG. 6 depicts another embodiment of an optical waveguide termination 11 in which the width of the curved section 25 is uniform.

Figure 7:
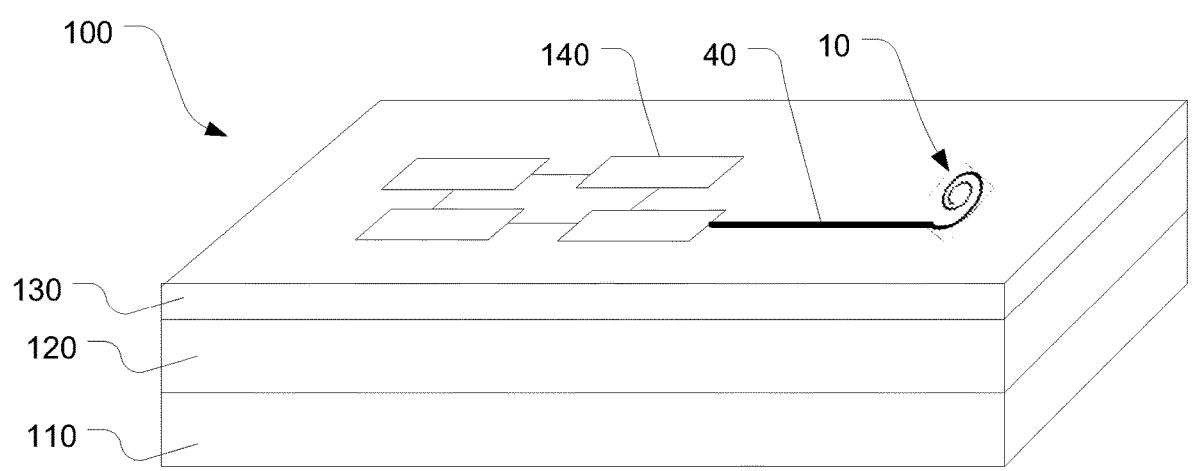
FIG. 7 illustrates a silicon photonic platform incorporating the spiral optical waveguide termination.

FIG. 7 depicts a photonic platform 100, e.g. a silicon photonic platform such as a silicon-on-insulator (SOI) photonic integrated circuit (PIC). The photonic platform 100 includes a substrate 110, a buried oxide layer 120 and an active silicon layer 130 in which an optical circuit 140 is formed. The optical circuit 140 includes the optical circuit waveguide 40 connected to the optical waveguide termination 10. The optical waveguide termination 10 is disposed in the active silicon layer. The optical waveguide termination 10 may be partially or fully etched in the active silicon layer 130. The optical waveguide termination may also be formed by deposition, epitaxial growth or other suitable fabrication technique.

Figure 8:
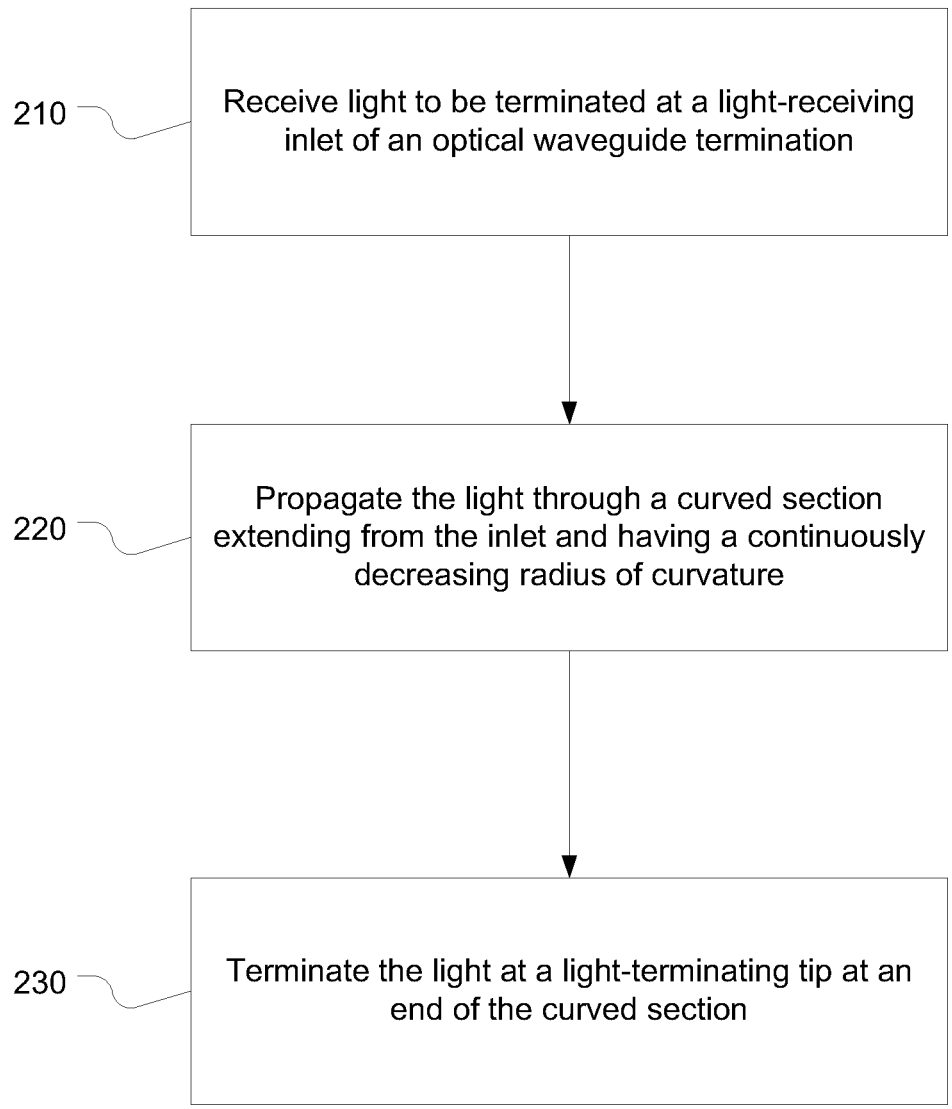
FIG. 8 illustrates a flowchart of a method of terminating light using the spiral optical waveguide termination.

Depicted in FIG. 8 is a method 200 of terminating light using the optical waveguide termination 10 disclosed above. The method 200 entails a step 210 of receiving light to be terminated at a light-receiving inlet 20 of an optical waveguide termination 10, a step 220 of propagating the light through the curved section 25 extending from the inlet 20 and having a continuously decreasing radius of curvature, and a step 230 of terminating the light at the light-terminating tip 30 at an end of the curved section 25. In some implementations of this method, propagating the light through the curved section 25 comprises propagating the light through the spiral waveguide termination 10 having a waveguide width that continuously decreases from the inlet 20 to the tip 30. In some implementations, the method further comprises absorbing the light using a doped region 50.

It is to be understood that the singular forms "a", "an" and "the" include plural referents unless the context clearly dictates otherwise. Thus, for example, reference to "a device" includes reference to one or more of such devices, i.e. that there is at least one device. The terms "comprising", "having", "including", "entailing" and "containing", or verb tense variants thereof, are to be construed as open-ended terms (i.e., meaning "including, but not limited to,") unless otherwise noted. All methods described herein can be performed in any suitable order unless otherwise indicated herein or otherwise clearly contradicted by context. The use of examples or exemplary language (e.g. "such as") is intended merely to better illustrate or describe embodiments of the invention and is not intended to limit the scope of the invention unless otherwise claimed.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the inventive concept(s) disclosed herein.

The invention claimed is:

1. An optical waveguide termination comprising:
   a light-receiving inlet for receiving light to be terminated;
   a curved section of a nanotaper waveguide extending from the inlet and having a continuously decreasing radius of curvature; and
   a light-terminating tip at an end of the curved section;
   wherein the curved section defines a spiral and has a waveguide width that continuously decreases from the inlet to the tip.

2. The optical waveguide termination of claim 1 wherein the optical waveguide termination is a silicon waveguide.

3. The optical waveguide termination of claim 2 wherein the silicon waveguide is partially etched.

4. The optical waveguide termination of claim 1 further comprising a doped region.

5. The optical waveguide termination of claim 1 wherein the tip comprises a facet angled with respect to an inlet face of the inlet-receiving inlet to further suppress back-reflection.

6. The optical waveguide termination of claim 1 wherein the spiral is a logarithmic spiral.

7. The optical waveguide termination of claim 6 wherein the logarithmic spiral comprises a radius of curvature that varies on a log scale from 5 µm to 1 µm over a length of 30 µm.

8. The optical waveguide termination of claim 1 wherein the light-receiving inlet has an inlet width of 500 nm and the light-terminating tip has a tip width of 200 nm.

9. A photonic platform comprising:
   a substrate;
   a buried oxide layer on the substrate;
   an optical circuit formed in an active silicon layer; and
   an optical waveguide termination formed in the active silicon layer and connected to the optical circuit, the optical waveguide termination comprising:
   a light-receiving inlet for receiving light to be terminated;
   a curved section of a nanotaper waveguide extending from the inlet and having a continuously decreasing radius of curvature; and
   a light-terminating tip at an end of the curved section;
   wherein the curved section has a waveguide width that continuously decreases from the inlet to the tip.

10. The photonic platform of claim 9 wherein the optical waveguide is a partially etched silicon waveguide.

11. The photonic platform of claim 9 further comprising a doped region.

12. The photonic platform of claim 9 wherein the tip comprises a facet angled with respect to an inlet face of the inlet-receiving inlet to further suppress back-reflection.

13. The photonic platform of claim 9 wherein the curved section defines a spiral.

14. The photonic platform of claim 13 wherein the spiral is a logarithmic spiral.

15. A method of terminating light, the method comprising:
   receiving light to be terminated at a light-receiving inlet of an optical waveguide termination;
   propagating the light through a curved section of a nanotaper waveguide extending from the inlet and having a continuously decreasing radius of curvature; and
   terminating the light at a light-terminating tip at an end of the curved section;
   wherein propagating the light through the curved section comprises propagating the light through a spiral waveguide having a waveguide width that continuously decreases from the inlet to the tip.

16. The method of claim 15 further comprising absorbing the light using a doped region.

* * * * *